(12) United States Patent
Zhang et al.

(10) Patent No.: US 11,674,464 B2
(45) Date of Patent: Jun. 13, 2023

(54) METHODS AND SYSTEMS FOR ENGINE COLD-START

(71) Applicant: Ford Global Technologies, LLC, Dearborn, MI (US)

(72) Inventors: Xiaogang Zhang, Novi, MI (US); Jianwen James Yi, West Bloomfiled, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 17/443,941

(22) Filed: Jul. 28, 2021

(65) Prior Publication Data

US 2023/0034824 A1 Feb. 2, 2023

(51) Int. Cl.

| F02D 41/06 | (2006.01) |
| F02D 41/32 | (2006.01) |
| F02D 19/02 | (2006.01) |
| F02B 19/10 | (2006.01) |
| F02D 19/06 | (2006.01) |
| F02B 19/12 | (2006.01) |

(Continued)

(52) U.S. Cl.
CPC ............ *F02D 41/064* (2013.01); *F02B 19/10* (2013.01); *F02B 19/108* (2013.01); *F02B 19/1085* (2013.01); *F02B 19/12* (2013.01); *F02D 19/021* (2013.01); *F02D 19/022* (2013.01); *F02D 19/0628* (2013.01); *F02D 19/0665* (2013.01); *F02D 19/0671* (2013.01); *F02D 19/0692* (2013.01); *F02D 19/0694* (2013.01); *F02D 41/0027* (2013.01); *F02D 41/3094* (2013.01); *F02D 41/32* (2013.01); *F02D 41/40* (2013.01); *F02M 37/04* (2013.01); *F02P 5/15* (2013.01); *F02D 19/0642* (2013.01); *F02D 19/0644* (2013.01); *F02D 2041/389* (2013.01)

(58) Field of Classification Search
CPC .... F02M 21/0024; F02M 25/12; F02M 27/02; F02M 31/18; F02D 19/022; F02D 19/0642–0647; F02D 19/0665; F02D 19/0671; F02D 19/0689; F02D 19/0692; F02D 41/0025; F02D 41/0027; F02D 41/3094; F02D 2041/3881; F02B 19/022; F02B 19/10; F02B 19/1019; F02B 19/108; F02B 19/1085; F02B 19/12
See application file for complete search history.

(56) References Cited

U.S. PATENT DOCUMENTS

| 4,108,114 A * | 8/1978 | Kosaka | F02B 43/08 123/3 |
| 4,140,090 A * | 2/1979 | Lindberg | F02B 19/108 123/3 |

(Continued)

FOREIGN PATENT DOCUMENTS

| CN | 110821653 A * | 2/2020 | ............ F02D 15/02 |
| CN | 111156111 A * | 5/2020 | |

(Continued)

*Primary Examiner* — John M Zaleskas
(74) *Attorney, Agent, or Firm* — Vincent Mastrogiacomo; McCoy Russell LLP

(57) ABSTRACT

Methods and systems are provided for injecting gaseous fuel during an engine start. In one example, a method comprises generating gaseous fuel via a fuel gasification device and injecting the gaseous fuel via a fuel injector. The fuel injector is configured to inject adjacent to an ignition device.

20 Claims, 6 Drawing Sheets

(51) Int. Cl.

| | |
|---|---|
| *F02D 41/30* | (2006.01) |
| *F02D 41/38* | (2006.01) |
| *F02D 41/40* | (2006.01) |
| *F02P 5/15* | (2006.01) |
| *F02M 37/04* | (2006.01) |
| *F02D 41/00* | (2006.01) |

(56) References Cited

U.S. PATENT DOCUMENTS

| | | | |
|---|---|---|---|
| 5,522,357 A * | 6/1996 | Nogi | F02B 19/10 |
| | | | 123/295 |
| 5,611,307 A * | 3/1997 | Watson | F02B 43/10 |
| | | | 123/259 |
| 8,516,980 B2 | 8/2013 | Leone et al. | |
| 8,925,518 B1 * | 1/2015 | Riley | F02D 41/0027 |
| | | | 123/304 |
| 9,382,857 B2 | 7/2016 | Glugla et al. | |
| 9,452,465 B2 | 9/2016 | Anderson et al. | |
| 9,777,646 B2 | 10/2017 | Bidner et al. | |
| 10,947,948 B1 * | 3/2021 | Glugla | F02P 15/08 |
| 10,989,129 B1 * | 4/2021 | Glugla | F02D 41/0002 |
| 11,060,443 B1 * | 7/2021 | Thomas | F02M 61/14 |
| 2003/0200939 A1 * | 10/2003 | Hiltner | F02B 43/10 |
| | | | 123/3 |
| 2004/0045514 A1 * | 3/2004 | Qian | F02B 43/10 |
| | | | 123/3 |
| 2005/0051130 A1 * | 3/2005 | Lampard | F02B 19/1014 |
| | | | 123/275 |
| 2006/0278195 A1 * | 12/2006 | Hotta | C01B 3/22 |
| | | | 123/274 |
| 2007/0144459 A1 * | 6/2007 | Fiveland | F02D 19/0671 |
| | | | 123/3 |
| 2007/0183939 A1 * | 8/2007 | Hotta | F02D 19/08 |
| | | | 700/266 |
| 2007/0204813 A1 * | 9/2007 | Arai | F02D 19/084 |
| | | | 123/25 A |
| 2008/0010993 A1 * | 1/2008 | Morgenstern | F02M 27/02 |
| | | | 60/780 |
| 2008/0236546 A1 * | 10/2008 | Kakuho | F02B 23/0663 |
| | | | 123/299 |
| 2008/0257301 A1 * | 10/2008 | Hotta | F02D 19/0676 |
| | | | 123/3 |
| 2009/0043479 A1 * | 2/2009 | Noda | F02D 19/0671 |
| | | | 123/304 |
| 2010/0319655 A1 * | 12/2010 | McClendon | F02B 19/108 |
| | | | 123/279 |
| 2011/0132287 A1 * | 6/2011 | Leone | F02B 43/12 |
| | | | 123/3 |
| 2011/0132289 A1 * | 6/2011 | Pursifull | F02D 19/0644 |
| | | | 123/3 |
| 2011/0132306 A1 * | 6/2011 | Kerns | F02B 43/12 |
| | | | 123/1 A |
| 2012/0000435 A1 * | 1/2012 | Scotto | H01M 8/04328 |
| | | | 123/3 |
| 2013/0000275 A1 * | 1/2013 | Scotto | F01N 3/0205 |
| | | | 60/299 |
| 2013/0055985 A1 * | 3/2013 | Gruber | F02B 19/12 |
| | | | 123/253 |
| 2013/0104850 A1 * | 5/2013 | Long | F02D 19/0692 |
| | | | 123/445 |
| 2014/0109866 A1 * | 4/2014 | Gruber | F02M 21/0227 |
| | | | 123/262 |
| 2014/0196686 A1 * | 7/2014 | Coldren | F02M 21/0245 |
| | | | 123/299 |
| 2014/0216029 A1 * | 8/2014 | Gruber | F02M 21/0245 |
| | | | 123/3 |
| 2014/0224208 A1 * | 8/2014 | Gruber | F02D 19/022 |
| | | | 123/260 |
| 2015/0107538 A1 * | 4/2015 | Sall | F02D 19/084 |
| | | | 123/3 |
| 2015/0128898 A1 * | 5/2015 | Osaka | F02B 19/08 |
| | | | 123/263 |
| 2015/0260131 A1 * | 9/2015 | Riley | B01D 53/002 |
| | | | 123/542 |
| 2016/0084189 A1 * | 3/2016 | Pursifull | F02M 63/0285 |
| | | | 123/456 |
| 2016/0265416 A1 * | 9/2016 | Ge | B01J 12/007 |
| 2016/0333770 A1 * | 11/2016 | Kreuter | F02B 19/108 |
| 2017/0051685 A1 * | 2/2017 | Scotto | F02M 27/02 |
| 2017/0101967 A1 * | 4/2017 | Loetz | F02B 19/16 |
| 2017/0306917 A1 * | 10/2017 | Kim | F02M 26/44 |
| 2018/0003132 A1 * | 1/2018 | Ginter | F02M 27/04 |
| 2018/0003136 A1 * | 1/2018 | Coldren | F02B 17/005 |
| 2018/0320610 A1 * | 11/2018 | Magnusson | F02D 41/0027 |
| 2018/0363539 A1 * | 12/2018 | Shelby | F02B 19/12 |
| 2021/0301739 A1 * | 9/2021 | Patterson | F02D 19/0671 |
| 2022/0056835 A1 * | 2/2022 | Voice | F02M 21/0227 |

FOREIGN PATENT DOCUMENTS

| | | | | |
|---|---|---|---|---|
| DE | 10356192 A1 | * | 7/2005 | F02B 19/00 |
| DE | 102017009613 A1 | * | 4/2018 | |
| DE | 102017210398 A1 | * | 12/2018 | F01N 5/02 |
| DE | 102019001163 A1 | * | 4/2019 | F02B 19/108 |
| GB | 2584735 A | * | 12/2020 | F02B 19/10 |
| JP | 2004353562 A | * | 12/2004 | |
| JP | 2005214079 A | | 8/2005 | |
| JP | 2008111399 A | * | 5/2008 | F02D 15/02 |
| JP | 2008133759 A | * | 6/2008 | B60C 23/041 |
| WO | WO-2008041241 A2 | * | 4/2008 | F02B 43/10 |
| WO | 2010101293 A1 | | 9/2010 | |
| WO | WO-2010101293 A1 | * | 9/2010 | C10G 31/00 |
| WO | WO-2014053167 A1 | * | 4/2014 | F02B 19/108 |
| WO | WO-2014111138 A1 | * | 7/2014 | F01N 5/02 |
| WO | WO-2019040432 A1 | * | 2/2019 | F02B 19/108 |
| WO | WO-2021043534 A1 | * | 3/2021 | F01P 3/20 |

* cited by examiner

METHODS AND SYSTEMS FOR ENGINE COLD-START

FIELD

The present description relates generally to a prechamber of an engine.

BACKGROUND/SUMMARY

Reduction of tailpipe emissions may be a shared goal among manufacturers in the automotive industry. As the standards for emissions continue to increase, technologies may continually evolve to meet the standards. Tailpipe emissions based on current standards may need to be reduced to meet future regulations.

One contributor to emissions may include engine cold-starts. Relatively large amounts of hydrocarbons (HC) may be generated during engine cold-starts. When the cold-start is occurring, spray droplets from a fuel injector may not evaporate, which may lead to a longer spray penetration. Longer spray penetrations may increase fuel film accumulation on a piston and a cylinder liner due to a spray impingement. The fuel film may not combust efficiently, resulting in HCs being released during the cold-start.

In one example, the issues described above may be addressed by a method for operating a reformer to generate a gaseous fuel, the method further including injecting the gaseous fuel through an injector directly adjacent to an ignition device in a prechamber. In this way, a fuel rich cloud is proximal to the ignition device, providing enhanced combustion conditions.

An example of the method may further include injecting the gaseous fuel within a threshold crank angle of top-dead center of a compression stroke. The threshold crank angle may be based on a duration of time in which spark is provided, wherein the injection occurs while spark is active. In one example, injecting the gaseous fuel includes injecting the gaseous fuel directly into a volume of the prechamber separate from and coupled to a volume of a combustion chamber. The reformer may be operated in response to an engine start request corresponding to an engine cold-start. Operating the reformer may further occur in response to an engine start request signaled by one or more of an ignition key being turned, an ignition button being depressed, and a vehicle door being opened.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a cold-start. The methods and systems may be configured to enhance combustion conditions during the cold-start of an engine. The engine may be arranged in an at least partially hybrid vehicle, as shown in FIG. 1.

Figure 2:
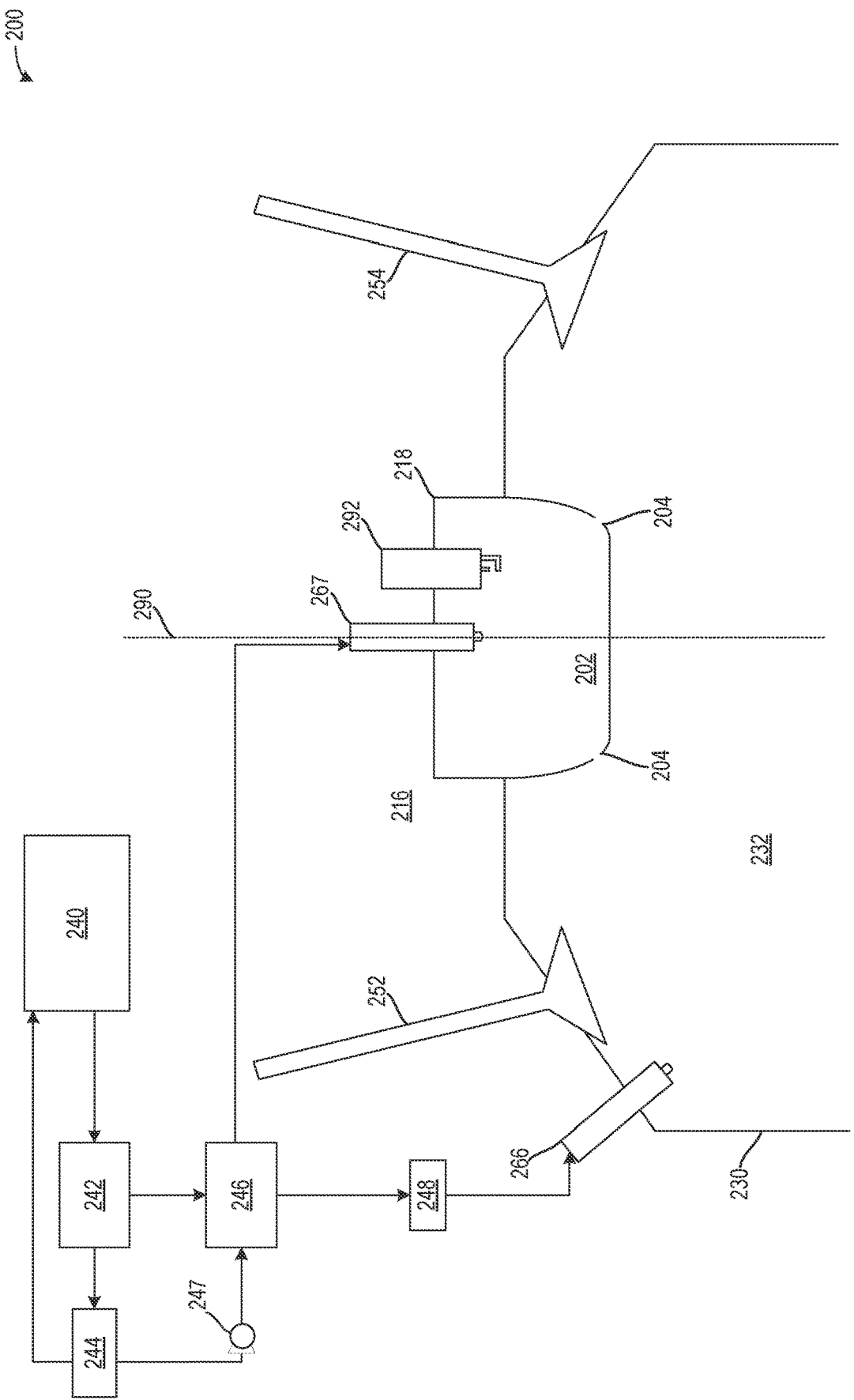
FIG. 2 illustrates a first embodiment of a system configured to direct gaseous fuel from a first example of a fuel gasification device to one or more injectors of an engine.
Figure 3:
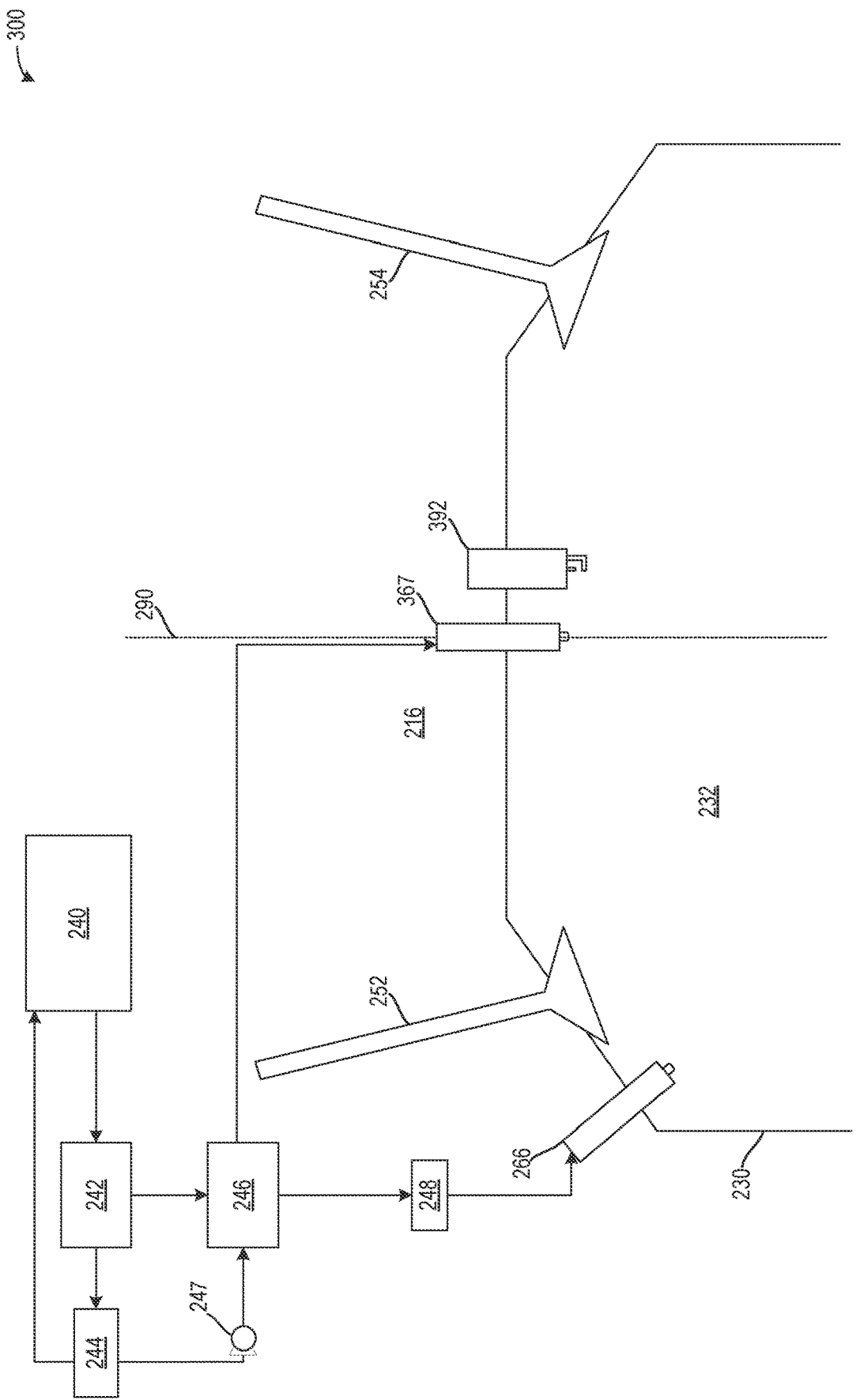
FIG. 3 illustrates a second embodiment of the system configured to direct gaseous fuel from the first example of the fuel gasification device to one or more injectors of the engine.
Figure 4:
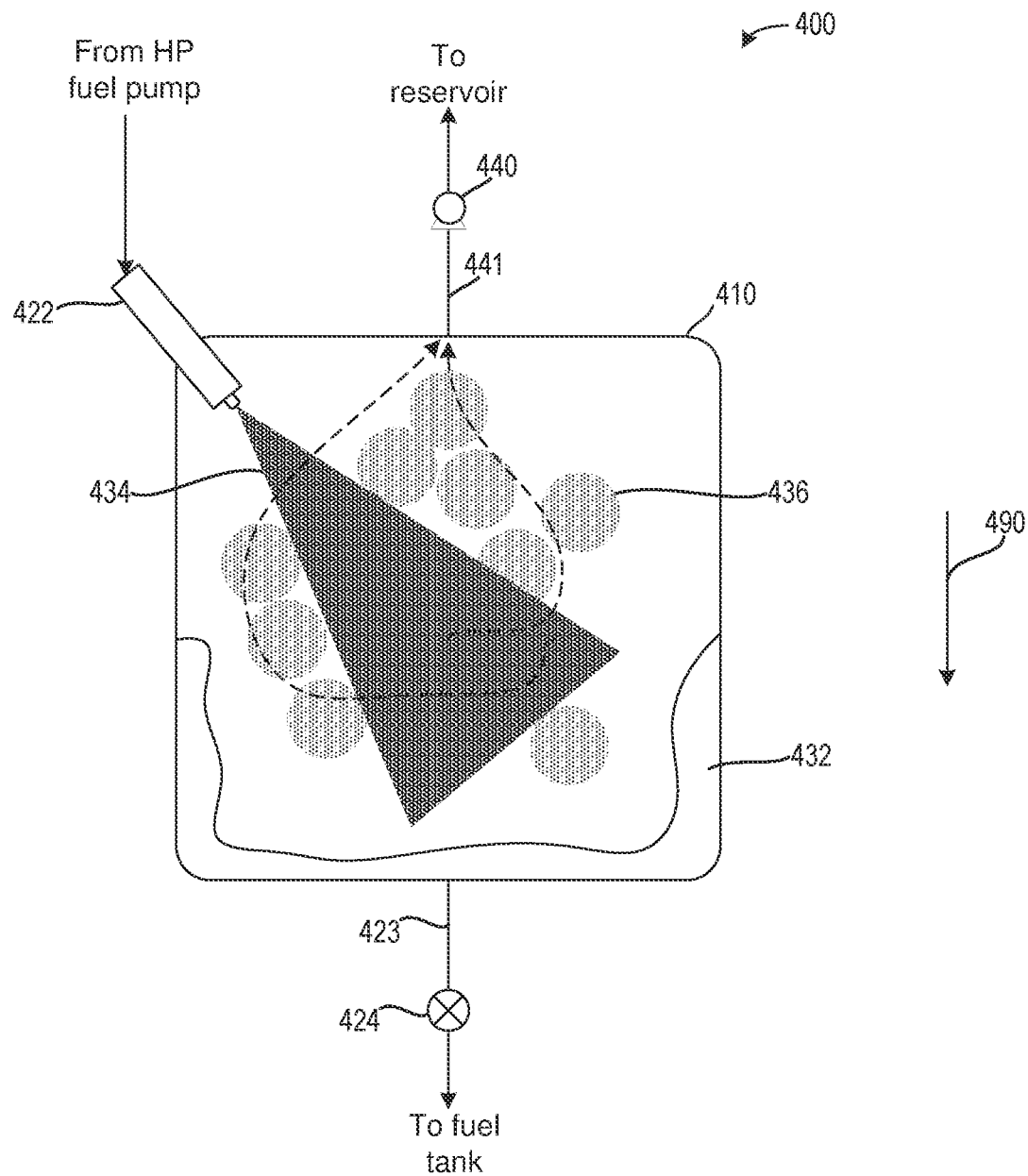
FIG. 4 illustrates a second example of a fuel gasification device.
Figure 5:
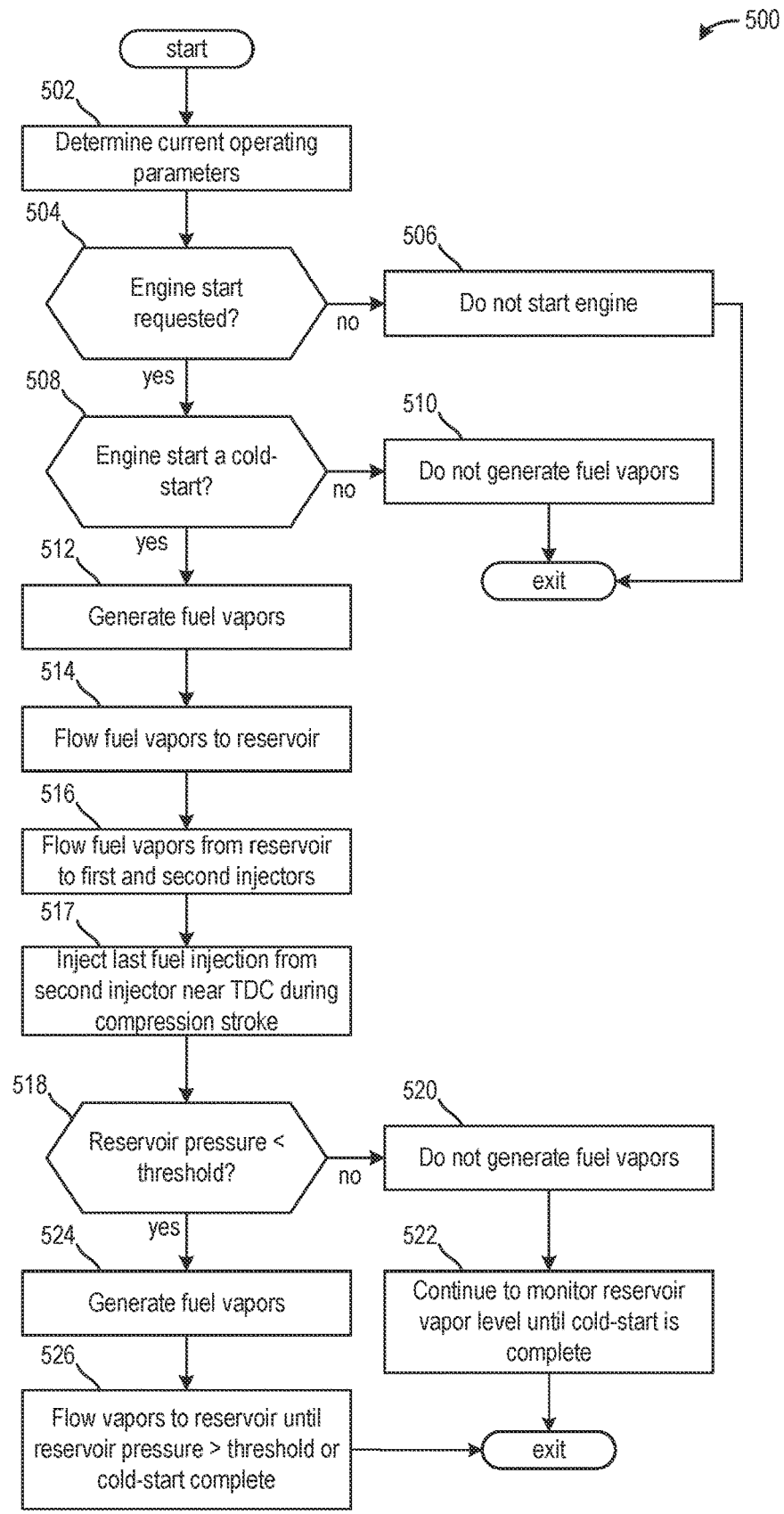
FIG. 5 illustrates a method for supplying fuel vapors to an injector.

In one embodiment, the fuel reformer may be coupled to an injector of a pre-chamber, as shown in FIG. 2. In another embodiment, the fuel reformer may be coupled to an injector positioned to inject directly into a main combustion chamber, as shown in FIG. 3. In some examples, a fuel evaporation chamber may be used in place of the fuel reformer, as shown in FIG. 4. A method for supplying fuel vapors to a fuel injector is illustrated in FIG. 5. An engine operating sequence including various engine cold-start conditions is graphically illustrated in FIG. 6.

FIGS. 1 to 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
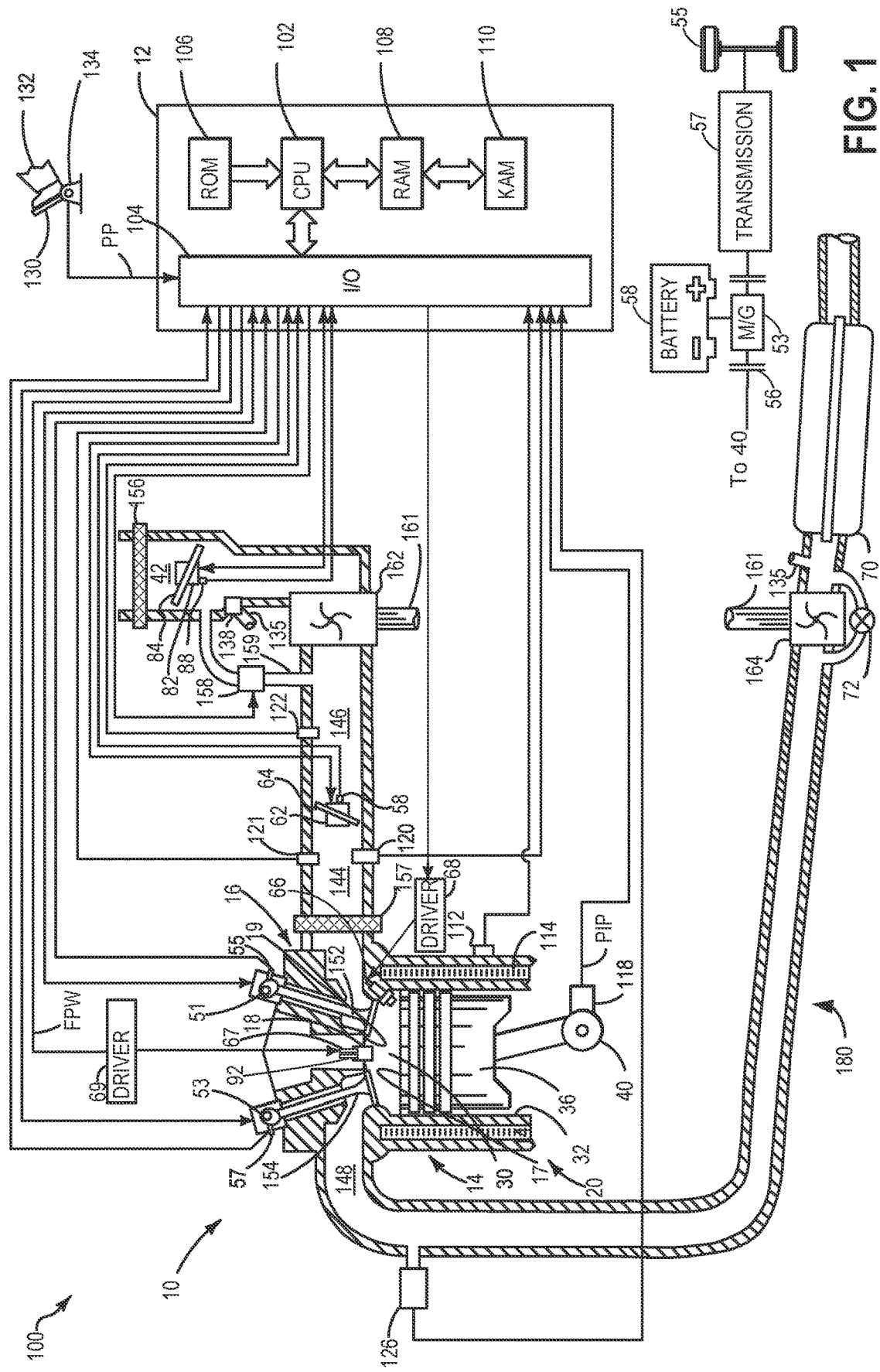
FIG. 1 illustrates a schematic of an engine included in a hybrid vehicle.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. The cylinder bore 20 may be defined as the volume enclosed by the cylinder walls 32. The cylinder head 16 may be coupled to the cylinder block 14, to enclose the cylinder bore 20. Thus, when coupled together, the cylinder head 16 and cylinder block 14 may form one or more combustion chambers. In particular, combustion chamber 30 may be the volume included between a top surface 17 of the piston 36 and a fire deck 19 of the cylinder head 16. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53, respectively. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such may the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

The combustion chamber 30 may include a pair of injectors including a first fuel injector 66 and a second fuel injector 67. The first fuel injector 66 may be positioned adjacent to intake valve 152 in an arrangement known as a side-port injection. The second fuel injector 67 may be positioned overhead the piston 36 in the cylinder head 16. Both the first fuel injector 66 and the second fuel injector 67 are positioned to inject fuel directly into an interior volume of the combustion chamber. A fuel-pulse width (FPW) may be signaled to the fuel injector 66 based on a signal from the controller 12 to the driver 68. Similarly, FPW may be signaled to the fuel injector 67 based on a signal from the controller 12 to a driver 69. A FPW supplied to each injector may correspond to an opening timing/duration. As such, the FPW may be directly proportional to a fueling request.

A prechamber 18 may be located within the cylinder head 16 of the combustion chamber 30. Specifically, the prechamber 18 is arranged within the cylinder head 16 and houses each of the second fuel injector 67 and an ignition device 92. The prechamber 18 may extend into the combustion chamber 30 and fluidly couple thereto via a plurality of openings arranged in a body of the prechamber 18. An interior volume of the prechamber 18 may be separated from an interior volume of the combustion chamber 30 via prechamber walls. The prechamber 18 may include one or more openings configured to fluidly coupled the interior volume of the prechamber 18 to the interior volume of the combustion chamber 30. In some examples of the engine 10, the prechamber 18 may be omitted. However, a positioning of the ignition device 92 and the fuel injector 67 may be maintained.

The cylinder walls 32, piston 36, and cylinder head 16 may thus form the combustion chamber 30, where a top surface 17 of the piston 36 serves as the bottom wall of the combustion chamber 30 while an opposed surface or fire deck 19 of the cylinder head 16 forms the top wall of the combustion chamber 30. Thus, the combustion chamber 30 may be the volume included within the top surface 17 of the piston 36, cylinder walls 32, and fire deck 19 of the cylinder head 16.

Fuel injector 67 may be positioned to inject fuel directly into an interior volume of the prechamber 18. Fuel injector 67 may deliver liquid fuel in proportion to the pulse width of signal FPW from controller 12. Fuel is delivered to fuel injector 67 by a fuel system including a fuel tank, fuel pump, and fuel rail. Fuel injector 67 is supplied operating current from driver 69 which responds to controller 12. In some examples, the engine 10 may be a diesel engine, and the fuel tank may include diesel fuel, which may be injected by injector 67 into the prechamber 18. However, in the example of FIG. 1, the engine 10 is a gasoline engine, with the ignition device 92 arranged within the prechamber 18 adjacent to the fuel injector 67.

Intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the air flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Emission control device 70 may be a catalytic converter and as such may also be referred to herein as catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70.

During the combustion cycle, each cylinder within engine 10 may undergo a four stroke cycle including: an intake stroke, compression stroke, power stroke, and exhaust stroke. During the intake stroke and power stroke, the piston 36 moves away from the cylinder head 16 towards a bottom of the cylinder increasing the volume between the top of the piston 36 and the fire deck 19. The position at which piston 36 is near the bottom of the cylinder and at the end of its intake and/or power strokes (e.g., when combustion chamber 30 is at its largest volume) is typically referred to by those of skill in the art as bottom dead center (BDC). Conversely, during the compression and exhaust strokes, the piston 36 moves away from BDC towards a top of the cylinder (e.g., fire deck 19), thus decreasing the volume between the top of the piston 36 and the fire deck 19. The position at which piston 36 is near the top of the cylinder and at the end of its compression and/or exhaust strokes (e.g., when combustion chamber 30 is at its smallest volume) is typically referred to by those of skill in the art as top-dead center (TDC). Thus, during the intake and power strokes, the piston 36 moves from TDC to BDC, and during the compression and exhaust strokes, the piston 36 moves from BDC to TDC.

Further, during the intake stroke, generally, the exhaust valves 154 close and the intake valves 152 open to admit intake air into the combustion chamber 30. During the compression stroke, both valves 152 and 154 may remain closed, as the piston 36 compresses the gas mixture admitted during the intake stroke. During the compression stroke, gases in the combustion chamber 30 may be pushed into the prechamber 18 due to the positive pressure created by the piston 36 as it travels towards the prechamber 18. The gases from the combustion chamber 30 may dissipate heat through one or more of the cylinder head 16 and ambient air via conduction and/or convention. As such, the temperature of the gases in the prechamber 18 may be reduced relative to the temperature of the gases in the combustion chamber 30.

When the piston 36 is near or at TDC during the compression and/or power stroke, fuel is injected into the combustion chamber 30 by injectors 66 and/or 67. During the ensuing power stroke, the valves 152 and 154 remain closed, as the expanding and combusting fuel and air mixture pushes the piston 36 towards BDC. In some examples, fuel may be injected prior to the piston 36 reaching TDC, during the compression stroke, via one or more of injectors 66 and 67. However, in other examples, fuel may be injected when the piston 36 reaches TDC. In yet further examples, fuel may be injected after the piston 36 reaches TDC and begins to translate back towards BDC during the expansion stroke. In yet further examples, fuel may be injected during both the compression and expansion strokes.

Fuel may be injected over a duration. An amount of fuel injected and/or the duration over which fuel is injected may be varied via pulse width modulation (PWM) according to one or more linear or non-linear equations. Further, the injectors 66 and 67 may include a plurality of injection orifices, and an amount of fuel injected out of each orifice may be varied as desired.

During the exhaust stroke, the exhaust valves 154 may open to release the combusted air-fuel mixture to exhaust manifold 148 and the piston 36 returns to TDC. Exhaust gases may continue to flow from the exhaust manifold 148, to the turbine 164 via exhaust passage 180.

Both the exhaust valves 154 and the intake valves 152 may be adjusted between respective closed first positions and open second positions. Further, the position of the valves 154 and 152 may be adjusted to any position between their respective first and second positions. In the closed first position of the intake valves 152, air and/or an air/fuel mixture does not flow between the intake manifold 144 and the combustion chamber 30. In the open second position of the intake valves 152, air and/or an air/fuel mixture flows between the intake manifold 144 and the combustion chamber 30. In the closed second position of the exhaust valves 154, air and/or an air fuel mixture does not flow between the combustion chamber 30 and the exhaust manifold 148. However, when the exhaust valves 154 is in the open second position, air and/or an air fuel mixture may flow between the combustion chamber 30 and the exhaust manifold 148.

Note that the above valve opening and closing schedule is described merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hell effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In one example, the controller 12 may control actuators to adjust cold-start conditions of the engine 10. Herein, cold-start conditions may include where an engine temperature is less than an ambient temperature and/or a desired engine temperature operating range. The engine temperature may be determined via feedback from temperature sensor 112 of the cooling sleeve 114. Additionally or alternatively, the engine temperature may be estimated based on one or more of an engine load, engine off duration, ambient temperature, coolant temperature, and the like. If cold-start conditions are met and an engine start is requested, then the controller 12 may signal to inject gaseous fuel via the first fuel injector 66 and the second fuel injector 67. Additionally or alternatively, the second fuel injector 67 may be scheduled to inject a final injection proximally to the ignition device 92 at a timing at or near TDC of the compression stroke. By doing this, a fuel rich cloud may be adjacent to the ignition device 92, thereby providing enhanced combustion conditions during the cold-start compared to liquid fuel injections. In this way, an accumulation of a fuel film in the combustion chamber 30 may be reduced.

Turning now to FIGS. 2 and 3, they show embodiments of a first engine system 200 and a second engine system 300, respectively. The first engine system 200 and the second engine system 300 may be substantially identical, except that the first engine system 200 includes a prechamber 218. Each of the first engine system 200 and the second engine system 300 may be used in the engine system 100 of FIG. 1.

Each of the first engine system 200 and the second engine system 300 may include a combustion chamber 230, an intake valve 252, an exhaust valve 254, and a first injector 266. In the first engine system 200, the prechamber 218 is arranged adjacent to a cylinder head 216 and fluidly coupled to a main combustion chamber volume 232 via a plurality of openings 204. The prechamber volume 202 may be separated from the main combustion chamber volume 232 via walls of the prechamber 218. A second injector 267 may be positioned to directly inject fuel into the prechamber volume 202, outside of the main combustion chamber volume 232. An ignition device 292, such as a spark plug, may be positioned to ignite a mixture of fuel and air within the prechamber volume 202.

In one example, the first injector 266 and the second injector 267 may be differentiated in that the first injector 266 may be a high-pressure injector positioned to inject fuel directly into the main combustion chamber volume 232, adjacent to the intake valve 252. The second injector 267 may be a lower pressure injector, positioned to inject fuel into the prechamber volume 202, outside of the main combustion chamber volume 232, as described above.

In the example of FIG. 2, the first injector 266 is positioned to inject at an angle relative to the central axis 290. The angle may be between 0 and 180 degrees relative to the central axis 290. The first injector 266 may inject a gaseous fuel directly into the main combustion chamber volume 232 distally to the ignition device 292. The second injector 267 may inject a gaseous fuel directly into the prechamber volume 202 adjacent to the ignition device 292 in a direction parallel to the central axis 290. In one example, the central axis 290 may correspond to an axis about which a piston of the combustion cylinder 230 oscillates.

A fuel system, configured to supply fuel to the first injector 266 and the second injector 267, may include a fuel tank 240 configured to store fuel. The fuel tank 240 may receive fuel externally via a refueling port of a vehicle into which a fuel nozzle may be inserted and liquid fuel dispensed to the fuel tank 240.

The fuel system may further include a fuel pump 242 configured to draw fuel from the fuel tank 240. The fuel pump 242 may distribute the fuel to other portions of the fuel system including a fuel reformer device 244 and/or a reservoir 246. The fuel reformer device 244 may receive liquid fuel from the fuel pump 242 and convert the fuel into gaseous fuel. In one example, the fuel, such as gasoline, may be converted into methane ($CH_4$) and hydrogen gas ($H_2$). In one example, the fuel reformer device 244 may utilize steam, generated via water contained within air, to convert hydrocarbons to hydrogen gas and carbon monoxide (CO). The hydrogen and carbon monoxide may then produce methane, carbon dioxide, and hydrogen gas.

The fuel reformer device 244 may deliver vapors, including the methane and the hydrogen gas, to the fuel tank 240 and/or the reservoir 246. In one example, the fuel reformer device 244 may supply fuel vapors to the reservoir 246 based on one or more conditions. The one or more conditions may include a reservoir pressure, a fuel vapor level in the reservoir 246, and a current fueling demand. For example, if the fuel vapor level in the reservoir 246 is less than a threshold level, which may thus also correspond with the reservoir pressure being less than a threshold pressure, then the fuel reformer device 244 may deliver fuel vapors to the reservoir 246. However, if the fuel vapor level in the reservoir 246 is greater than or equal to the threshold level, then the fuel reformer device 244 may deliver fuel vapors to the fuel tank 240. The threshold level may be equal to a non-zero, positive number. The threshold pressure may be equal to a non-zero, positive number. In one example, the threshold pressure may be equal to a pressure corresponding to a 50% or less fill of the reservoir. Additionally or alternatively, the threshold pressure may be equal to a pressure corresponding to 30% or less fill of the reservoir. In one example, a secondary pump 247 may be arranged between the fuel reformer device 244 and the reservoir 246, wherein the secondary pump 247 may be activated to maintain the threshold level of fuel vapors within the reservoir 246. When the secondary pump 247 is deactivated, the fuel reformer device 244 may direct vapors to the fuel tank 240.

The reservoir 246 may be fluidly coupled directly to the second injector 267 and a common rail 248. The common rail 248 may be a high-pressure rail and supply fuel to the first injector 266. In this way, each of the first injector 266 and the second injector 267 may supply gaseous fuel (e.g., vapors) during conditions, such as a cold-start, to reduce fuel impingement and/or fuel film formation onto surfaces of the combustion chamber 30.

In the example of FIG. 3, the second engine system 300 may include where a second injector 367 receives vapors from the reservoir 246. In both the first engine system 200 and the second engine system 300, the second injector 267 and the second injector 367 are arranged adjacent to the ignition device 292 and 392, respectively. The second injectors 267, 367 are positioned to inject parallel to the central axis 290 proximally to the ignition devices 292, 392, respectively.

In the example of FIG. 3, the first injector 266 may directly inject a gaseous fuel directly into the main combustion chamber volume 232. Similarly, the second injector 367 may directly inject a gaseous fuel directly into the main combustion chamber volume 232. The first injector 266 may inject an injection distal to the ignition device 392 at a side-injection location and the second injector 367 may inject an injection proximally to the ignition device 392 at an overhead injection location. The second injector 367 may be configured as a low-pressure injector, similar to the second injector 267 of FIG. 2. In one example, an engine, such as engine 10 of FIG. 1, may include both the first engine system 200 and the second engine system 300, such that some cylinders may include the prechamber 218 and some cylinders may be free of the prechamber 218.

In one example, the fuel systems of FIGS. 2 and 3 may share the fuel tank 240 with a liquid fuel injection system. Additionally or alternatively, the pump 242 may be used in both the gaseous and liquid fuel injection systems. However, the reservoir 246 and the reformer 244 may not be used when liquid injections are desired, such as outside of the cold-start. In this way, a fuel gasification device, such as the reformer 244, may be deactivated outside of the cold-start.

As will be described in greater detail below with respect to the method of FIG. 5, the injectors may be operated to decrease fuel film formation during some engine operating parameters, such as a cold-start. In one example, multiple injections may be utilized, wherein a final injection of a plurality of injections may be injected from the second injector, close to top-dead center (TDC) of a compression stroke. The final injection may provide a fuel rich cloud adjacent to the ignition device, which may enhance combustion. In this way, a local air/fuel ratio adjacent to the ignition device may be greater than an air/fuel ratio distal to the ignition device.

Turning now to FIG. 4, it shows an embodiment 400 of a fuel evaporation chamber 410. The fuel evaporation chamber 410 may be used instead of the fuel reformer 244 of FIGS. 2 and 3. In this way, the fuel gasification device may include multiple embodiments without departing from the scope of the present disclosure.

The fuel evaporation chamber 410 may include an injector 422 positioned to inject liquid fuel into an interior volume thereof. The injector 422 may receive fuel from a high pressure fuel pump fluidly coupled to a fuel tank of a fuel system. In one example, the injector 422 may receive fuel from the pump 242 of FIGS. 2 and 3. An injection 434 may be provided by the injector 422 in response to a signal from a controller (e.g., controller 12 of FIG. 1). The injector 422 may be a third injector 422, wherein the third injector is a high-pressure injector.

A portion of the injection 434 may generate a fuel film 432 within the fuel evaporation chamber 410 due to incomplete evaporation. A remaining portion of the injection 434 may gasify and generate fuel vapors 436. Based on an arrangement of the fuel evaporation chamber 410, the fuel film 432 may accumulate at a lower region of the fuel evaporation chamber 410. A passage 423, which may include a valve 424, may direct the fuel film 432 to the fuel tank. In one example, the valve 424 may be a check valve, a solenoid valve, or other type of valve adjusted in response to a pressure of the fuel evaporation chamber 410. In one example, if the pressure of the fuel evaporation chamber is greater than a threshold chamber pressure, then the valve 424 may move to an open position and fuel film 432 may flow through the passage 423, through the open valve 424, and to the fuel tank 410. This may occur passively without signals from the controller to the valve 424. In some examples, additionally or alternatively, the controller may be configured to adjust a position of the valve 424 outside of conditions where the threshold chamber pressure is exceeded. By positioning the passage 423 at the lower region of the fuel evaporation chamber 410, when the pressure of the fuel evaporation chamber 410 exceeds the threshold pressure, then the fuel film 432 may flow through the passage 423 prior to fuel vapors 436 or the injection 434. This may increase fuel vapor retention in the fuel evaporation chamber 410, increasing a vapor supply to a vapor reservoir.

When fuel vapors are desired, a reservoir pump 440 may be activated to draw fuel vapors 436 from the fuel evaporation chamber 410 to a reservoir, such as reservoir 246 of FIG. 2. Additionally or alternatively, a passage 441, along which the pump 440 may be arranged, may be arranged in an upper region of the fuel evaporation chamber 410. In some examples, the pump 440 may be omitted and fuel vapors 436 may flow through the passage 441 via pressure from the fuel evaporation chamber 410. Herein, upper and lower are defined relative to a direction of gravity 490.

Thus, in the examples of FIGS. 2-4, a system may include a fuel gasification device, such as a reformer or an evaporation chamber, that may be operated in response to an engine start request being requested when cold-start conditions are met. The fuel gasification device may generate fuel vapors, which are sent to a vapor reservoir coupled to injectors of a combustion chamber. The injectors may inject gaseous fuel, rather than liquid fuel, during the cold-start, which may enhance combustion and decrease unburned fuel emissions. In some examples, depending on conditions of the cold-start, the injectors may be commanded to inject a mixture of liquid and gaseous fuel. For example, the first fuel injector may inject liquid and gaseous fuel and the second fuel injector may inject only gaseous fuel. Injecting liquid and gaseous fuel may include executing multiple injections wherein individual injections include only liquid fuel or gaseous fuel. A method for operating the fuel gasification device and the injectors is described below.

Turning now to FIG. 5, it shows a method 500 for executing a cold-start. The method 500 may be executed in combination with the engine systems of FIGS. 1, 2, and 3. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

At 502, the method 500 includes determining, estimating, and/or measuring current operating parameters. Current operating parameters may include, but are not limited to, one or more of a throttle position, a manifold pressure, an engine speed, an engine temperature, a vehicle speed, an ambient temperature, and an air/fuel ratio.

At 504, the method 500 may include determining if an engine start is requested. The engine start may be requested in response to one or more of an ignition key being inserted into an ignition key switch, an ignition button being depressed, a remote start being activated, a vehicle operator sitting on a driver's seat, and a vehicle door, such as a driver door, being opened. The remote start may be signaled via an electronic key, a cell phone, a smart phone, a tablet, a laptop, and the like.

If an engine start is not requested, then at 506, the method 500 may include not starting the engine. Fuel may not be injected into the engine or a fuel gasification device and fuel vapor may not be generated. Method 500 ends.

If the engine start is requested, then at 508, the method 500 may include determining if the engine start is a cold-start. The engine start may be a cold-start if an engine temperature is less than a threshold temperature. In one example, the threshold temperature is equal to an ambient temperature. Engine cold-start conditions may be determined based on feedback from the temperature sensor 112 of the cooling sleeve 114. The temperature sensor 112 may directly sense a temperature of the engine, wherein the temperature may be compared to the threshold temperature via the controller.

If the engine start is not a cold-start, then at 510, the method 500 may include not generating fuel vapors. In one example, fuel may not be delivered to the fuel gasification device, such as the fuel reformer or the fuel evaporation chamber. In this way, only liquid fuel may be injected via the first and second injectors. Additionally or alternatively, an injection and spark timing may be advanced relative to injection and spark timing during the cold-start. In one example, the second injector (e.g., the lower pressure injector) may inject liquid fuel prior to TDC of a compression stroke and an ignition device may be activated prior to TDC of the compression stroke.

If the engine start is a cold-start, then at 512, the method 500 may include generating fuel vapors. In this way, liquid fuel may be delivered to the fuel gasification device via a pump coupled to a fuel tank. In one example, the controller may signal to operate the pump and the fuel gasification device to generate fuel vapors. If the fuel system includes a fuel reformer, then fuel may be delivered to the fuel reformer via a pump, wherein the fuel may be converted to hydrogen gas and methane. If the fuel system includes a fuel evaporation chamber, then fuel may be injected into the fuel evaporation chamber via an injector coupled to the pump, wherein the injection may generate a fuel vapor and a fuel film.

At 514, the method 500 may include flowing fuel vapors to a reservoir. In one example, a pump or other device may flow fuel vapors to the reservoir during the cold-start fluidly coupled to a fuel rail and/or directly to an injector. Additionally or alternatively, fuel vapor flow to the reservoir may occur in response to a pressure of the reservoir.

At 516, the method 500 may include flowing fuel vapors from the reservoir to the first and second injectors. In one example, a common fuel rail may be arranged between the first injector and the reservoir. In one example, the first injector is similar to first injector 266 of FIGS. 2 and 3. The second injector is similar to the second injector 267 of FIG. 2 or the second injector 367 of FIG. 3. As such, the first injector may inject fuel vapors (e.g., gaseous fuel) at a location distal to an ignition device and the second injector may inject fuel vapors at a location proximal to the ignition device.

At 517, the method 500 may include injecting a last gaseous fuel injection of a combustion cycle via the second injector near top-dead center (TDC) during a compression stroke. In one example, the second injector injects fuel vapors into a prechamber adjacent to the ignition device near TDC of the compression stroke. In some examples, additionally or alternatively, the second injector injects fuel vapors directly into a main combustion chamber volume adjacent to the ignition device near TDC of the compression stroke. Near TDC may be defined as within 50 crank angles, or 30 crank angles, or 20 crank angles, or less of TDC, wherein TDC of the compression stroke may correspond to a transition from the compression stroke to an expansion stroke. In one example, the second injector injects at a timing delayed relative to its injection timing outside of a hot-start. In one example, the second injector injects at exactly TDC of the compression stroke. The ignition device may be activated (e.g., spark provided) at slightly after TDC, such that the ignition device timing is delayed relative to its timing during the engine hot-start. In one example, near TDC may be based on the spark timing of the ignition device such that the injection may overlap with the spark. By injecting the fuel vapor near the ignition device, a fuel rich cloud may be adjacent to the ignition device, which may enhance combustion and decrease fuel film formation in the combustion chamber.

In one example, only gaseous fuel is injected during the cold-start and only liquid fuel is injected outside the cold-start via the first and second fuel injectors. Furthermore, the injection and ignition timing is retarded during the cold-start conditions relative to the injection and ignition timing outside the cold-start conditions.

At 518, the method 500 may include determining if the reservoir pressure is less than the threshold pressure. The threshold pressure may be based on a pressure corresponding to a volume of vapor in the reservoir to maintain a desired pressure therein. If the reservoir pressure is less than the threshold pressure, then the pressure therein may be too low, and injection pressures may be affected.

In some examples, if the reservoir pressure is less than the threshold pressure following yes from 518, then the method may delay generating fuel vapors until the reservoir pressure decreases below the threshold pressure. In one example, unused vapors from the reservoir may be maintained therein until a subsequent cold-start. Additionally or alternatively, following completion of the cold-start, the vapors from the reservoir may be delivered to the fuel tank or to a fuel vapor canister.

If the reservoir vapor level is not less than the threshold level, then at 520, the method 500 may include not generating fuel vapors. As such, liquid fuel may not be delivered to a fuel gasification device. At 522, the method 500 may include continuing to monitor a reservoir vapor level until the cold-start is complete.

If the reservoir vapor level is less than the threshold level, then at 524, the method 500 may include generating fuel vapors, similar to 512 as described above. As such, a pump and/or an injector may be activated and fuel may be delivered to the fuel gasification device to generate more fuel vapor to be delivered to the reservoir.

At 526, the method 500 may include flowing vapors to the reservoir until the reservoir pressure is greater than the threshold pressure or until the cold-start is complete.

Figure 6:
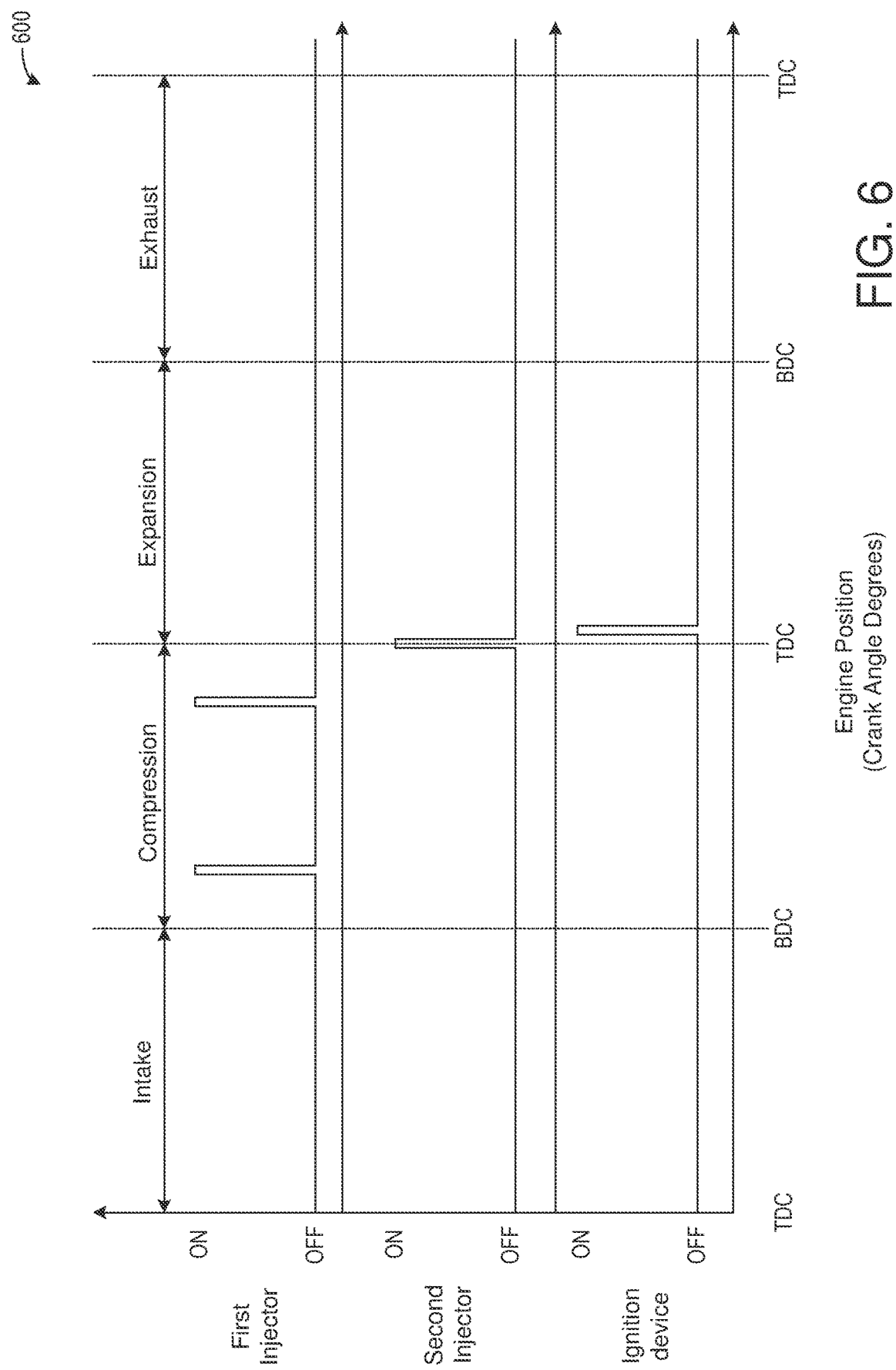
FIG. 6 illustrates an engine operating sequence graphically illustrating various engine conditions during a cold-start.

Turning now to FIG. 6, it shows an embodiment of a graph 600 graphically illustrating an engine cycle including one or more fuel injections during a cold-start of the engine. The one or more fuel injections may be executed via a first injector and a second injector, which may be similar to the first injector 266 and second injector 267 of FIG. 2. In other examples, the first injector and the second injector may be similar to the first injector 266 and the second injector 367 of FIG. 3. In this way, the injection schedule may be similar for the first engine system 200 of FIG. 2 and the second engine system 300 of FIG. 3.

The graph 600 illustrates an engine position along the abscissa. An activity of the first injector, the second injector, and the ignition device is shown along the ordinate. The engine position may be measured in crank angle degrees, wherein the engine cycle includes an intake stroke, a compression stroke, an expansion stroke, and an exhaust stroke. The intake stroke may occur from top-dead center (TDC) to bottom-dead center (BDC). The compression stroke may occur following the intake stroke from BDC to TDC. The expansion stroke may occur following the compression stroke from TDC to BDC. The exhaust stroke may occur following the expansion stroke from BDC to TDC. During the compression stroke, multiple injections may be provided via the first injector and the second injector. In one example, the first injector may inject multiple injections prior to a final injection being injected by the second injector. As illustrated, the second injector injection timing may be within TDC by a threshold crank angle degree. In one example, the threshold crank angle degree may be equal to 50 degrees or less. Additionally or alternatively, the threshold crank angle degree may be equal to 30 degrees or less. Additionally or alternatively, the threshold crank angle degree may be equal to 20 degrees or less. Additionally or alternatively, the threshold crank angle degree may be equal to 10 degrees or less. In one example, the threshold crank angle is exactly 0 degrees such that the final injection occurs exactly at top-dead center of the compression stroke. When the final injection is injected by the second injector, the ignition device may provide a spark.

The multiple injections may include only gaseous fuel injections. In some examples, operation of the fuel injectors may differ during the cold-start. For example, the first fuel injector may inject two injections and the second fuel injector may only inject one injection. The first fuel injection of the first fuel injector may be a gaseous fuel injection during the compression stroke. In one example, the first fuel injection may be a gaseous fuel injection due to the engine temperature being less than the threshold engine temperature (e.g., a cold-start).

As such, vaporization of the first fuel injection may occur such that fuel film may not accumulate. The second injection via the first fuel injector may also be a gaseous fuel injection during the compression stroke. Additionally or alternatively, the first fuel injector may inject all its injections during only the intake stroke. In another example, additionally or alternatively, the first fuel injector may inject a gaseous fuel injection during the intake stroke and another gaseous fuel injection during the compression stroke. An amount of fuel injected in each of the injections of the first injector may be equal or different. The fuel gasification device may be activated to provide fuel vapor to the reservoir, which supplies fuel vapors to the first and second fuel injectors. Fuel injection amounts of the first fuel injector and the second fuel injector may be coordinated to meet a total desired fueling. In one example, fueling commands of the injectors may be biased such that the first fuel injector injects more fuel than the second fuel injector. In one example, the second fuel injector may inject an amount of fuel based on a combustion stability. That is to say, the second fuel injector may include an amount of fuel corresponding to a pilot injection such that a stable flame may form, thereby combusting a remaining air/fuel mixture within the combustion chamber. Additionally or alternatively, the fuel injection amounts of the first fuel injector and the second fuel injector may be substantially equal.

The second fuel injector may inject a gaseous fuel injection at TDC of the compression stroke. Said another way, the second fuel injector may inject the gaseous fuel injection at a transition from the compression to the expansion stroke. The ignition device may be activated after the injection provided via the second injector during the compression stroke. In one example, the ignition device is activated within 50 crank angles of TDC of the compression stroke. Additionally or alternatively, the ignition device is activated within 30, or 20, or 10 crank angles of TDC of the compression stroke.

FIG. 6 illustrates an example injection and spark timing schedule for an engine during a cold-start. During an engine hot-start, where the engine temperature is equal to or greater than the threshold desired engine temperature, the fuel injections provided by the first and second injectors may include liquid fuel. In one example, liquid fuel may be desired to reduce knock. Additionally or alternatively, the injection and spark timing may be advanced relative to the timings during the cold-start. For example, the first injector may inject at a late intake stroke stage (e.g., closer to BDC than TDC) and at an early intake stroke stage (e.g., closer to BDC than TDC). The second injector may inject during the compression stroke prior to TDC. In one example, the second injector timing is advanced 30 crank angles relative to the cold-start injection timing. The spark timing is advanced and occurs prior to TDC>

An embodiment of a method, comprises operating a reformer to generate a gaseous fuel and injecting the gaseous fuel through an injector directly adjacent to an ignition device arranged in a prechamber. A first example of the method further includes injecting the gaseous fuel within a threshold crank angle of top-dead center of a compression stroke. A second example of the method, optionally including the first example, further includes injecting the gaseous fuel includes injecting the gaseous fuel directly into a volume of the prechamber separate from a volume of a combustion chamber to which the prechamber is coupled. A third example of the method, optionally including one or more of the previous examples, further includes where the injector is a low-pressure injector, further comprising injecting the gaseous fuel through a high-pressure injector positioned to inject directly to a combustion chamber fluidly coupled to the prechamber, wherein the high pressure injector injects distally to the ignition device. A fourth example of the method, optionally including one or more of the previous examples, further includes where operating the reformer occurs in response to a cold-start. A fifth example of the method, optionally including one or more of the previous examples, further includes where operating the reformer occurs in response to an engine start request signaled by one or more of an ignition key being turned, an ignition button being depressed, and a vehicle door being opened. A sixth example of the method, optionally including one or more of the previous examples, further includes flowing the gaseous fuel form the reformer to a reservoir, wherein the reservoir is fluidly coupled to the injector.

An embodiment of a system, comprises an engine, a gaseous fuel reservoir fluidly coupled to a first fuel injector and a second fuel injector, the first fuel injector positioned to inject adjacent to an intake valve of a combustion chamber and the second fuel injector positioned to inject into a prechamber adjacent to an ignition device, and a controller with computer-readable instructions stored on non-transitory memory thereof that when executed cause the controller to generate gaseous fuel in response to a cold-start of the engine and a pressure of the gaseous fuel reservoir being less than a threshold pressure, flow gaseous fuel to the first fuel injector and the second fuel injector, and execute a final injection of a combustion cycle via the second fuel injector at top-dead center of a compression stroke. A first example of the system further includes where the instructions further cause the controller to flow fuel to a fuel reformer device via a fuel pump coupled to a fuel tank, wherein the fuel reformer device is configured to gasify the fuel. A second example of the system, optionally including the first example, further includes where the instructions further cause the controller to flow fuel to a fuel evaporation chamber via a fuel pump coupled to a fuel tank, wherein fuel is injected into the fuel evaporation chamber via a third fuel injector. A third example of the system, optionally including one or more of the previous examples, further includes where the instructions further cause the controller to activate the ignition device after top-dead center of the compression stroke. A fourth example of the system, optionally including one or more of the previous examples, further includes where the first fuel injector is a high pressure injector and the second fuel injector is a low pressure injector. A fifth example of the system, optionally including one or more of the previous examples, further includes where an interior volume of the prechamber is separated from a combustion chamber volume via prechamber walls. A sixth example of the system, optionally including one or more of the previous examples, further includes where the instructions further cause the controller to determine an engine start is requested in response to a vehicle door being opened. A seventh example of the system, optionally including one or more of the previous examples, further includes a central axis along which a piston oscillates in the combustion chamber, wherein the first fuel injector injects at an angle between 0 and 180 degrees and the second fuel injector injects at an angle parallel to the central axis.

An embodiment of an engine system, comprises a fuel system comprising a fuel tank, a pump, a fuel gasification device, and a reservoir, a first fuel injector and a second fuel injector fluidly coupled to the reservoir, wherein the first fuel injector is positioned to inject an angle relative to a central axis of a combustion chamber and the second fuel injector is positioned to inject parallel to the central axis, and a controller with computer-readable instructions stored on non-transitory memory thereof that when executed cause the controller to flow fuel to the fuel gasification device in response to a pressure of the reservoir being less than a threshold pressure and an engine start being requested, inject a final fuel injection via the second fuel injector following one or more injections via the first and second fuel injectors, and provide a spark via an ignition device during or after the final fuel injection. A first example of the engine system further includes where the engine start further comprises where the engine start is a cold-start. A second example of the engine system, optionally including the first example, further includes where the second fuel injector and the ignition device are arranged in a prechamber, wherein a volume of the prechamber is separated from a volume of the combustion chamber via prechamber walls. A third example of the engine system, optionally including one or more of the previous examples, further includes where a piston in the combustion chamber is configured to oscillate in a direction parallel to the central axis. A fourth example of the engine system, optionally including one or more of the previous examples, further includes where the fuel gasification device comprises a third fuel injector configured to inject directly therein.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    operating a reformer to generate a gaseous fuel; and
    injecting the gaseous fuel through an injector directly adjacent to an ignition device arranged in a prechamber of a combustion chamber having a piston, the combustion chamber fluidly coupled to the prechamber, the injector positioned at a central axis along which the piston oscillates in the combustion chamber and the injector injecting the gaseous fuel directly into the prechamber in a direction parallel to the central axis, wherein the injector is a low-pressure injector; and
    injecting the gaseous fuel through a high-pressure injector, wherein the high-pressure injector injects distally to the ignition device with a cylinder positioned between the high-pressure injector and the injector, the high-pressure injector being more outboard from the central axis than a cylinder valve.

2. The method of claim 1, further comprising injecting the gaseous fuel within a threshold crank angle of top-dead center of a compression stroke, the high-pressure injector positioned to inject directly to the combustion chamber at an angle between 0 and 180 degrees.

3. The method of claim 1, further comprising injecting the gaseous fuel directly into a volume of the prechamber separate from a volume of a combustion chamber to which the prechamber is coupled.

4. The method of claim 1, wherein the high-pressure injector provides first and second compression stroke injection to inject the gaseous fuel, and the injector provides a top-dead-center injection to inject the gaseous fuel, followed by an ignition event by the ignition device during an expansion stroke to ignite the injected gaseous fuel.

5. The method of claim 1, wherein operating the reformer occurs in response to a cold-start.

6. The method of claim 1, wherein operating the reformer occurs in response to an engine start request signaled by one or more of an ignition key being turned, an ignition button being depressed, and a vehicle door being opened.

7. The method of claim 1, further comprising flowing the gaseous fuel from the reformer to a reservoir, wherein the reservoir is fluidly coupled to the injector.

8. A system, comprising:
    an engine;
    a gaseous fuel reservoir fluidly coupled to a first fuel injector and a second fuel injector, the first fuel injector positioned to inject adjacent to an intake valve of a combustion chamber and the second fuel injector positioned to inject into a prechamber adjacent to an ignition device, the second fuel injector positioned at a central axis along which a piston oscillates in the combustion chamber and the first fuel injector injecting gaseous fuel directly into the prechamber, the first fuel injector positioned outboard of the intake valve relative to the central axis; and
    a controller with computer-readable instructions stored on non-transitory memory thereof that when executed cause the controller to:
        generate the gaseous fuel in response to a cold-start of the engine and a pressure of the gaseous fuel reservoir being less than a threshold pressure;
        flow the gaseous fuel to the first fuel injector and the second fuel injector; and
        execute first and second injections of a combustion cycle via the first fuel injector before top-dead center and further execute a final injection of the combustion cycle via the second fuel injector at the top-dead center of a compression stroke.

9. The system of claim 8, wherein the instructions further cause the controller to flow fuel to a fuel reformer device via a fuel pump coupled to a fuel tank, wherein the fuel reformer device is configured to gasify the fuel.

10. The system of claim 8, wherein the instructions further cause the controller to flow fuel to a fuel evaporation chamber via a fuel pump coupled to a fuel tank, wherein fuel is injected into the fuel evaporation chamber via a third fuel injector.

11. The system of claim 8, wherein the instructions further cause the controller to activate the ignition device after the top-dead center of the compression stroke.

12. The system of claim 8, wherein the first fuel injector is a high pressure injector and the second fuel injector is a low pressure injector.

13. The system of claim 8, wherein an interior volume of the prechamber is separated from a combustion chamber volume via prechamber walls.

14. The system of claim 8, wherein the instructions further cause the controller to determine an engine start is requested in response to a vehicle door being opened.

15. The system of claim 8, wherein the first fuel injector injects at an angle between 0 and 180 degrees and the second fuel injector injects at an angle parallel to the central axis.

16. An engine system, comprising:
    a fuel system comprising a fuel tank, a pump, a fuel gasification device, and a reservoir;
    a first fuel injector and a second fuel injector fluidly coupled to the reservoir, wherein the first fuel injector is positioned to inject at an angle relative to a central axis of a combustion chamber and the second fuel injector is positioned to inject parallel to the central axis of the combustion chamber; and a controller with computer-readable instructions stored on non-transitory memory thereof that when executed cause the controller to:
- flow fuel to the fuel gasification device in response to a pressure of the reservoir being less than a threshold pressure and an engine start being requested;
- inject a final fuel injection via the second fuel injector following one or more injections via the first and second fuel injectors; and
- provide a spark via an ignition device during or after the final fuel injection.

17. The engine system of claim 16, wherein the engine start further comprises where the engine start is a cold-start, the second fuel injector positioned at the central axis along which a piston oscillates in the combustion chamber and the first fuel injector injecting gaseous fuel directly into a prechamber, the first fuel injector positioned outboard of an intake valve relative to the central axis, the instructions further including instructions to execute first and second injections of a combustion cycle via the first fuel injector before top-dead center and further execute the final injection of the combustion cycle via the second fuel injector.

18. The engine system of claim 16, wherein the second fuel injector and the ignition device are arranged in a prechamber, wherein a volume of the prechamber is separated from a volume of the combustion chamber via prechamber walls.

19. The engine system of claim 16, wherein a piston of the combustion chamber is configured to oscillate in a direction parallel to the central axis.

20. The engine system of claim 16, wherein the fuel gasification device comprises a third fuel injector configured to inject directly therein.

* * * * *